United States Patent Office 3,337,505
Patented Aug. 22, 1967

3,337,505
PROCESS TO IMPROVE HEAT STABILITY OF POLYOXYMETHYLENE
Muneyoshi Minami, Yoshizo Tsuda, Kiichiro Sando, Junzo Kashiro, and Kiyoshi Tamura, Shiga-ken, Japan, assignors to Toho Rayon Kabushiki Kaisha, Tokyo, Japan, a corporation of Japan
No Drawing. Filed Oct. 8, 1963, Ser. No. 314,629
11 Claims. (Cl. 260—67)

The present invention relates to a process to improve heat-stability of polyoxymethylene employing a compound (which hereinafter is called N-peracylamide) having at least one nitrogen atom to which nitrogen atom at least 2 carboxylic acyl radicals or one carboxylic acyl radical and at least one thiocarbonyl radical are bound.

Macro-molecular polyoxymethylene itself is superior in chemical as well as thermal stability to low molecular polyoxymethylene, however, its weak point is that the stability is lost as time passes by. As a matter of fact, in order to meet the commercial demand, in carrying out heat-treatment thereof in molding, some additional treatment must be done.

This weak point mentioned above is mainly attributable to the hydroxyl group existing as a terminal group, and attempts have long been advocated so far to enhance the heat-stability by esterificating or etherificating this unstable terminal group, for example, as in "Hochmoleculare Organische Verbindungen," Springer-Verlag (1932), by H. Staudinger. There have already been proposed commercial scale processes for esterification of the terminal OH of polyoxymethylene, where carboxylic anhydride or ketene is used as acylating agent.

We have found that the terminal OH of polyoxymethylene can be very effectively acylated by N-acylamides having in its molecule at least one nitrogen atom to which nitrogen atom at least 2 carboxylic acyl radicals are bound, or one carboxylic acyl radical and at least one thiocarbonyl radical are bound.

In the present invention, as acylating agent N-peracylamide whose general formula shown below can be employed.

(I)

(wherein X represents carbonyl or thiocarbonyl, R represents optionally substituted alkyl, optionally substituted cycloalkyl, optionally substituted alkenyl, optionally substituted aryl or optionally substituted heterocyclic; $R_1$ represents optionally substituted alkyl, optionally substituted cycloalkyl, optionally substituted aryl, optionally substituted heterocyclic, optionally substituted alkenyl, alkoxy, carbalkoxy, substituted amino or substituted carbamoyl; $R_2$ represents hydrogen, optionally substituted alkyl, optionally substituted cycloalkyl, optionally substituted aryl, optionally substituted heterocyclic, optionally substituted alkenyl, carboxylic acyl or substituted amino; and $R_1$ and $R_2$, when taken together, may form a heterocyclic ring with the nitrogen atom and X).

In the Formula I, R may be an alkyl having 1–20 carbon atoms or an aryl such as phenyl or naphthyl. Alternately, R may be a cycloalkyl such as cyclohexyl or cyclopentyl or a heterocyclic group such as furyl, thienyl, pyridyl, pyranyl or benzopyranyl. Furthermore, R can have one or more substituents such as alkyl, aryl, alkoxy, alkylthio, halo or nitro. Thus, R may be fluoromethyl, chloromethyl, α-chloroethyl, ethoxymethyl, α- or β-ethylthioethyl, benzyl, tolyl, xylyl, methoxyphenyl, chlorophenyl, dichlorophenyl, nitrophenyl or chloronitrophenyl.

$R_1$ can be any one of the groups as in the case of R. $R_1$ may be an alkenyl or a substituted alkenyl such as vinyl, propenyl, allyl or phenylvinyl. Furthermore, $R_1$ may be an alkoxy such as methoxy or ethoxy, a carbalkoxy such as carbomethoxy or carbethoxy, a substituted amino such as dimethylamino or piperizinoamino, or a substituted carbamoyl such as N-phenyl-N-methyl-carbamoyl, N-phenyl-N - acetyl - carbamoyl or N - diacetylamino-N-acetyl-carbamoyl.

$R_2$ may be hydrogen, but preferred $R_2$ is a suitable organic group. The representation of $R_2$ covers real big range. It can be an alkyl of 1–20 carbon atoms, an alkenyl of 1–20 carbon atoms, a cycloalkyl of 5 or 6 ring carbon atoms, an aryl such as phenyl, napthyl or anthryl, a heterocyclic group such as furyl, thienyl, pyridyl, pyranyl, quinolyl, benzpyranyl, quinazolinyl, oxazolyl, thiazolyl, morpholino, piperidino, succinimido, phthalimido, pyrrolyl, imidazolyl, piperazino, triazolyl, tetrazolyl, or their hydro- or oxo-derivatives.

In case $R_2$ is a heterocyclic group having —NH—, it is preferred that "yl" is on that position, or the hydrogen atom is replaced with a suitable substitutional radical. $R_2$ can have one or more substituents such as alkyl, aryl, cycloalkyl, heterocyclic, alkoxy, aryloxy, alkylthio, halo, nitro, cyano, acyl, acyloxy, carbalkoxy, substituted amino, substituted carbamoyl or substituted sulfamoyl. Thus, $R_2$ may be tolyl, xylyl, dodecylphenyl, ethylcyclohexyl, benzyl, phenethyl, cyclopentamethyl, furfuryl, ethoxymethyl, methoxyphenyl, ethoxyphenyl, phenoxyphenyl, ethylthioethyl, fluoromethyl, chlorophenyl, nitrophenyl, cyanophenyl, acetylphenyl, 9-acetyl-carbazolyl, 4-acetyl-2,6-dioxo-piperazine-1-yl, acetoxyethyl, β-diacetylaminoethyl or dimethylsulfamoylphenyl, 2-phenylquinazolone-3-yl, or 3,5-diphenyl-4H-1,2,4-triazole-4-yl. Furthermore, $R_2$ may be a carboxylic acyl such as acetyl or benzoyl, or a substituted amino such as dimethylamino, diphenylamino, acetylamino, N-methyl-N-acetylamino, diacetylamino, N-acetyl-N-benzoyl-amino or N-acetyl - N - (1H-1,2,3,4-tetrazole-1-yl)-amino.

In the Formula I, $R_1$ and $R_2$, when taken together, may form a heterocyclic ring with N and X. For example, they may form a lactam ring such as caprolactam, phthalimidine or oxoindole, a dicarbimide ring such as succinimide, adipimide, phthalimide or naphthalimide, a dicarbohydrazide ring such as succinhydrazide or phthalhydrazide, or other heterocyclic ring such as 2,3- or 2,6-dioxo-piperazine, 2,6-dioxo-morpholine, 2,6 - dioxo - thiomorpholine, oxazolidone, hydantoin, thiohydantoin, imidazolone, isatin or acetylenediurein.

The following are some of the examples of N-peracylamides which can be employed to the process of this invention.

diacetamide
dipropionamide
distearamide
dibenzamide
difuramide
N-methyl-diacetamide
N-butyl-diacetamide
N-lauryl-diacetamide
N-heptadecyl-diacetamide
N-β-pyridyl-diacetamide
N-methyl-distearamide
N-ethyl-difluoroacetamide
N-cetyl-diethoxyacetamide
N-butyl-di-β-ethylthiopropionamide
N-diacetylaminoethyl-diacetamide
N-butyl-difuramide
N-acetoxyethyl-diacetamide
N-allyl-diacetamide
N-acetylnylon
N-cyclohexyl-diacetamide N-cyclopentyl-methyl-diacetamide
N-ethylcyclohexyl-diacetamide
N-methyl-dicyclohexyl carboxylic amide
N-butyl-dibenzamide
N-ethyl-dinaphthamide
N-butyl-dimethoxybenzamide
N-butyl-ditoluamide
N-methyl-dichlorobenzamide
N-ethyl-dichloronitrobenzamide
diacetanilide
dichloroacetanilide
dipalmitanilide
di-$\alpha$-chloropropionanilide
di-$\alpha$-ethylthiopropionanilide
diacetotoluidide
diacetododecylanilide
diacetoxylidide
diacetanisidide
diacetophenetidide
diacetophenoxyanilide
diacetocyanoanilide
diacetoacetylanilide
diacetodimethylsulfamoylanilide
diacetonitroanilide
diacetochloroanilide
diacetodichloroanilide
diacetonaphthylamide
diacetanthrylamide
diacetobenzylamide
6-quinolyl-diacetamide
N-acetylcarbazolyl-diacetamide
3-diacetylamino-2-phenylquinazolone
4-diacetylamino-3,5-diphenyl-1,2,4-triazole
4-diacetylamino-3,4-dihydrocumarin
N-acetyl-benzamide
dibenzanilide
dichlorobenzanilide
N-acetyl-benzanilide
N-acetyl-furanilide
N-methyl-N-chloroacetyl-naphthamide
N-crotonoyl-benzanilide
N-methyl-N-cinnamoyl-acetamide
triacetamide
tribenzamide
N-acetyl-dibenzamide
N-acetyl-caprolactam.
N-acetyl-phthalimidine
N-acetyl-oxoindole
N,N'-diacetyl-2,5-dioxopiperazine
N-acetyl-succinimide
N-acetyl-adipimide
N-acetyl-phthalimide
N-acetyl-naphthalimide
N-benzoyl-succinimide
N-benzoyl-phthalimide
N-acetyl-4-phenyl-2,6-dioxomorpholine
N-acetyl-4-phenyl-2,6-dioxopiperazine
N-acetyl-2,6-dioxomorpholine
N-acetyl-2,6-dioxothiomorpholine
N-acetylurethane
N-methyl-N-acetylurethane
N-dimethylcarbamoyl-acetamide
N-piperidinocarbamoyl-acetamide
N-carbethoxy-acetanilide
3-acetyl-2-oxazolidone
1,3-diacetylhydantoin
1,3-diacetyl-4-diacetylaminomethylimidazolone
tetracetylacetylenediurein
oxalyl-bis-(-N-acetanilide)
N,N'-dibenzoyl-N,N'-dimethyloxamide
N-methyl-N-ethoxalyl-acetamide
N-acetyl-isatin
N,N'-diacetyl-2,3-dioxopiperazine N,N-dimethyl-N',N'-diacetylhydrazine
N,N-diphenyl-N',N'-diacetylhydrazine
triacetylhydrazine
triacethylmethylhydrazine
tetraacetylhydrazine
N,N'-dibenzoyl-N,N'-diacetylhydrazine
hexaacetyl-oxalhydrazide
5-triacetylhydrazinotetrazole
N-morpholino-diacetamide
N-diacetylamino-succinimide
N,N-diacetylsuccinhydrazide
N-acetyl-N'-phenylphthalhydrazide
N-acetyl-N'-methylphthalhydrazide
N,N'-diacetylphthalhydrazide
N-acetyl-thioacetanilide
N-acetyl-ethylthiocarbamine
3-acetyl-2-thiohydantoin
N-acetyl-thiobenzanilide In the present invention, polyoxymethylene is a homopolymer of formaldehyde or trioxane, or a copolymer obtained by copolymerizing trioxane with a suitable copolymerizable monomer such as dioxolane, dioxepane, or styrene.

According to the process of this invention, it is not always necessary to have a catalyst to acylate the terminal radicals of polyoxymethylene. However, ordinarily it is desirable to employ an acylating catalyst. As acylating catalysts, hitherto known acylating catalysts can be employed in acyl exchange in so far as, they do not decompose polyoxymethylene to a remarkable extent, however, according to the process of this invention, the basic salts of alkaline metals, the basic salts of alkaline earth metals, organic bases, the salts made from organic bases and acids, and the acylating catalysts selected from among the groups made up from Lewis acid and Lewis acid complex compounds are preferable.

As such acylating catalysts, the basic salts of alkaline metals, such as sodium acetate, potassium acetate, and the basic salts of alkaline earth metals such as calcium acetate, and organic bases such as dimethylaniline, diethylaniline, pyridine, pycoline, lutidine, quinoline, triethylamine, tripropylamine, tributylamine, tetra alkyl ethylenediamine, alkylmorpholine, alkylpiperidine, alkylpiperazine, etc., can be employed.

In addition, their salts of fluoric acid, hydrochloric acid, hydrobromic acid, hydroiodic acid, and their quaternary ammonium salts such as fluoride, chloride, bromide or iodide with the radical such as methyl, ethyl, propyl, butyl, octyl, cetyl, benzyl, or phenethyl, can be employed. As to organic bases, they are especially preferably acylating catalysts and the greater the basicity is, the better becomes the catalysing efficiency.

The amount of acylating catalyst employed against polyoxymethylene can be varied in wide range, but on average, in case of organic bases, 1 to 50% by weight, or more preferably 3 to 30% by weight, and in case of other salts and complex compounds, 0.0001 to 1% by weight or more preferably 0.001 to 0.1% by weight can be applied thereto.

Substitutional acylating reaction is carried out usually at room temperature up to 250° C., or more preferably between 130 to 190° C.

Here, there is no special restriction on the employed amount of N-peracylamide against polyoxymethylene, however, 2 to 10 times by weight can be preferably employed.

The reaction can be carried out without employing the solvent, however, even employing the solvent, the reaction can be carried out likewise. As the example of such a solvent as mentioned above, $\gamma$-butyrolactone, acetophenone, dimethyl formamide.

In case the solvent is employed the amount employed may be sufficiently 10 to 100% by weight against N-peracylamide.

In the acylating reaction by means of N-peracylamide as proposed by this invention, it is possible to control the decomposition of polyoxymethylene in the process of the reaction, and to obtain the aimed product in a more preferable state by adding one or more cracking controllers such as carbodiimides, isocyanates, isothiocyanates, cyanamides, epoxy compounds, vinylesters, or thiovinylethers. Such cracking-controllers can be applied by the amount of 0.2 to 20% by weight against polyoxymethylene.

The employment of hitherto known terminal treatment agent along with the N-peracylamide of the present invention will not spoil the effect thereof.

By the addition of amide stabilizer such as nylon, or bisphenol antioxidant, the better heat stability of macro polyoxymethylene is obtained.

In carrying out the acetylation of polyoxymethylene the process of this invention is better in the following points than hithertofor practiced process employing carboxylic acid anhydride.

(1) Ordinary anhydrous carboxylic anhydride always produces free carboxylic acid, and this carboxylic acid reacts upon polyoxymethylene causing cracking thereof, lessening the yield of polymer, reducing the degree of polymerization, and worsening the heat stability of the polymer obtained.

While the N-peracylamides of this invention produce in the reaction only acidamides, or acidimides, which do not merely cause the decomposition of polyoxymethylene, but rather promote heat stabilization of polyoxymethylene synergistically.

(2) In carrying out the acylation of polyoxymethylene, it is more preferable to carry out the reaction in melting state homogeneously than heterogenously.

In case of the polymer obtained by polymerizing trioxane in solid phase, especially the above is hoped for, because the degree of the crystalization ih higher than the polymer obtained from the solution of trioxane or formaldehyde gas.

In order to carry out the reaction homogeneously the employment of the compound having the boiling point of 180° C. or more is preferable because polyoxymethylene whose melting point is about 180° C., becomes easily soluble in solvent around the temperature. On this point, as given before N-peracylamides are all of high boiling point, and especially against polyoxymethylene, these are good solvents, and they are convenient for carrying out the reaction homogeneously so that it is not necessary to add the third good solvent.

(3) In case N-peracylamides of high boiling point are employed, the reaction can be carried out under atmospheric pressure, and in such a case the recovery of formaldehyde-gas which partly produced through the decomposition of polyoxymethylene becomes easy.

(4) In case acylation is done by carboxylic acid anhydride, formaldehyde produced by the decomposition of a part of polymer in the reaction, is easy to react upon carboxylic acid anhydride to produce methylene dicarboxylate, and causes a loss of the reagent for reaction.

However, above mentioned N-peracylamides of high boiling point mostly do not react on formaldehyde, and the loss during reaction is substantially very little.

(5) In the process of this invention, the acidamides or acidimides produced as the result of the reaction are changed into N-peracylamide by the reacylation thereof with acidanhydride, for example, and again can be employed to the process of this invention.

The following are the examples to further illustrate the present invention.

As macro molecular polyoxymethylene, the following are employed;

(1) Polymer (POM–1) obtained by irradiating 1 mr. of electron-ray onto crystal trioxane which is subjected to heat-polymerization at 55° C., for 2 hours, and is rinsed carefully with acetone so that no trioxane is left over, and is vacuum-dried.

(2) Polymer (POM–2) obtained by well mixing crystal trioxane with 0.03% triethyloxonium borofluoric acid salt as a catalyst dissolved in 1% methylene chloride solution, which mixture is subjected to heat-polymerization at 58° C. for 2 hours, and is filtered, rinsed with acetone, and then vacuum-dried.

(3) Polymer (POM–3) obtained by having 5% butylvinyl co-axisted with 80% trioxane, n-heptane solution, and by subjecting this to reaction at 70° C. along with 0.02% triethyl oxonium borofluoric acid salt as a catalyst.

(4) Copolymer (POM–4) obtained by subjecting to reaction along with 15% styrene.

(5) Copolymer (POM–5) obtained by adding 5% formal dioxepane to 80% trioxane heptane solution, and then by copolymerizing this mixture with 0.02% triethyloxonium boric-fluoric acid salt.

(6) Polymer (POM–6) obtained by polymerizing formaldehyde anhydrous gas through jetting into heptane at 0° C. along with 0.01% tributyl amine, and then by filtering, rinsing with acetone, and finally by vacuum drying.

The degree of polymerization of these polymers is represented by $\eta_{inh}$ which is obtained by measuring respective viscosity of 0.5% parachlorphenol solution at 60° C. containing 2% α-pinene.

The percentage of decreased amount of polymer as it is heated at 200° C. for 30 minutes or 60 minutes is described by $D_{200}^{30}$ or $D_{200}^{60}$ as a means of describing heat-stability.

The percentage of decreased amount of polymer when 1% methylene bis-4-methyl-6-tertiary-butylphenol as anti-oxidant, and copolymer comprising 3% nylon 6 and nylon 610 as a polyamide heat stabilizer are added thereto, is represented by $D_{200}^{30}NA$.

*Example 1*

3 grams of ground trioxane polymer is heat-treated at 165° C. for an hour along with 30 grams of γ-butyrolactone solution with or without various kind of catalysts.

After reaction, the treated matter is cooled, filtered, rinsed, and dried up, and thus white polymer is obtained. The yielding ratio, the heat cracking ratio and the degree of viscosity are given in Table I below.

As in observed in the table, $D_{200}^{30}$ of untreated polymer is 57.0%, $D_{200}^{30}NA$ being 41.4%, and heat-stability is very much ameliorated.

TABLE I

| Conc. of Reactant, percent | Catalyst | Amount to be added, percent | Yield | $D_{200}^{30}$, percent | $D_{200}^{30}$ NA | $\eta_{inh}$ |
|---|---|---|---|---|---|---|
| 30 | Sodium Acetate | 0.01 | 45.3 | 7.5 | 2.2 | 1.70 |
| 30 | Pyridine | 1.0 | 45.4 |  | 0.9 |  |
| 10 | None |  | 51.5 | 18.0 | 2.4 | 1.76 |

Example 2

A result obtained when N-acetyl phthalimide is employed as a reaction reagent in the above reaction, is given in Table II.

As to the degree of polymerization, $\eta_{inh}$ of acetylated polymer is 1.34 against 1.40 of the untreated polymer and thus no remarkable change is observed.

TABLE II

| Conc. of Reactant, percent | Catalyst | Amount to be added, percent | Yield, percent | $D_{200}^{30}$, percent | $D_{200}^{30}$ NA, percent | $\eta_{inh}$ |
|---|---|---|---|---|---|---|
| 10 | Potassium Acetate | 0.01 | 60.0 | 22.3 | 4.9 | 1.45 |
| 30 | Sodium Acetate | 0.01 | 69.2 | 10.4 | 1.4 | 1.42 |
| 50 | Pyridine | 5 | 80.7 | 26.0 | 0.4 | 1.66 |
| 10 | Dimethylaniline | 10 | 61.3 | 30.5 | [1] 10.2 | |
| 10 | Trimethylbenzylanmoniumchloride | 0.1 | 54.7 | 35.1 | [1] 15.8 | |
| 10 | Quinoline | 10 | 61.5 | 21.2 | [1] 3.8 | |

[1] Reaction Time = a half hour.

The heat-stability is very much improved as described by the table.

Example 3

30 grams of POM-2 is mixed with 90 grams of diacetanilide and the mixture is put into a flask and the air within the solution and inside the flask is completely replaced for nitrogen-gas at 70° C.–80° C., and then the mixture is subjected to reaction at 175 C. for 1.5 hours.

After the reaction 90 grams of γ-butylolactone preheated at 175° C. is added at once.

The solution is cooled off, filtered, rinsed with acetone, and vacuum dried.

Thus, white acetylated polymer is obtained.

The yielding ratio is 94%; $D_{200}^{60}$ is 21.8%; $D_{200}^{60}NA$ is 0.5%.

While untreated polymer has $D_{200}^{60}$ being 38%, and $D_{200}^{60}NA$ being 12.1% and in comparison with the above, the heat stability is very much improved.

In regard to the degree of polymerization of this polymer before and after the reaction, $\eta_{inh}$ of acetylated polymer is −1.38 against −1.40 of untreated polymer, and no remarkable change is observed.

Example 4

The mixture of 10 grams of POM-2 and 100 grams of diacetanilide is mixed with 10% antioxidant, diphenylamine, and the mixture is subjected to reaction at 170° C. for 1.5 hours.

The solidified polymer after cooling is ground, and carefully rinsed with acetone, and filtered, and vacuum-dried.

The obtained white polymer has the yielding ratio of 95%, $D_{200}^{60}$ being 25.1%, $D_{200}^{60NA}$ being 0.6%.

In this case too, heat-stability is remarkably enhanced.

Example 5

In case 0.1% dibenzyldisulfide in place of diphenylamine is added in the above case, the yielding ratio of polymer is 94%, $D_{200}^{60}$ being 24.3%, $D_{200}^{60NA}$ being 0.6%.

Example 6

The mixture of 10 grams of POM-2 and 100 grams of diacetanilide is subjected to reaction in the presence of 0.01% cetylpyridinumchloride.

The rinsing, in this case, of acetylated polymer is carried out with warm alcohol for 3 or 4 times, and specially carefully it is rinsed.

The yielding ratio is 98%; $D_{200}^{60}$ is 27.2%; $D_{200}^{60}NA$ is 0.7%.

Example 7

In place of the cetyl pyridinumchloride as a catalyst in the foregoing case, 10% pyridine is added to the reaction mixture, and the yield in this case is 90; $D_{200}^{60NA}$ is 0.9%.

Example 8

In the foregoing Example 3, formaldehyde polymer (POM-6) is employed, and the reaction is carried at 160° C. for 2 hours and yield is 88% $D_{200}^{60NA}$ is 0.8%; $\eta_{inh}$ is 1.5.

The untreated polymer has $D_{200}^{60NA}$ being 38.4%, and $\eta_{inh}$ being 1.5.

Example 9

The mixture of 10 grams of POM-1 and 50 grams of acetylphthalimide is well mixed up, and is subjected to reaction at 170° C. for an hour in a flask.

After reaction, 50 grams of γ-butyrolactone preheated at 170° C. is added thereto at once, and the whole mixture is cooled off, and the coming out polymer is filtered, rinsed carefully with acetone, and vacuum dried.

Thus obtained polymer has the yield of 98%, $D_{200}^{60}$ being 32.4%, $D_{200}^{60NA}$ being 1.1%, $\eta_{inh}$ being 1.47.

$D_{200}^{60}$ of the untreated polymer is 47.5%; $D_{200}^{60NA}$ thereof being 17.2%, $\eta_{inh}$ thereof being 1.52.

Example 10

In the foregoing Example 9, the solution of 10 grams of acetylphthalimide and 40 grams of γ-butyrolactone as solvent are subjected to reaction.

The polymer coming out as cooling treatment is carried out is subjected to the same treatments as in the foregoing cases.

Thus obtained polymer has the yield of 83%, $D_{200}^{60NA}$ being 0.7%, and $\eta_{inh}$ being 1.45.

Example 11

In the foregoing Example 9, the solution of 25 grams of acetylphthalimide, and 25 grams of γ-butyrolactone solution are subjected to reaction in the presence of 0.1% sodium alcoholate.

The obtained polymer has the yield of 90%, $D_{200}^{60}$ being 21.8%, $D_{200}^{60NA}$ being 0.8, and $\eta_{inh}$ being 1.43.

Example 12

0.1% antioxidant diphenylamine is added to the mixture of 10 grams of POM-3, 25 grams acetylphthalimide and 25 grams of solvent anisole, and this is subjected to reaction at 180° C. for 30 minutes.

Thus obtained polymer has the yield of 96%, $D_{200}^{60NA}$ being 0.3% and $\eta_{inh}$ being 1.24.

The untreated polymer has $D_{200}^{60NA}$ being 11.6% and $\eta_{inh}$ being 1.31.

Example 13

10 grams of POM-4, 30 grams of acetylphthalimide, 30 grams of solvent acetophenone are subjected to reaction at 160° C. for 1.5 hours.

The obtained polymer has the yield of 98%, $D_{200}^{60NA}$ being 0.5%, and $\eta_{inh}$ being 1.34.

The untreated polymer has $D_{200}^{60NA}$ being 13.5% and $\eta_{inh}$ being 1.37.

Example 14

The mixture of 10 grams of POM-5 and 30 grams of diacetanilide is subjected to reaction at 170° C. for 1.5 hours in a flask.

After reaction, this is poured in a fine stream into acetone while well stirring, and the solidified polymer is ground, and again rinsed with acetone, and vacuum-dried.

Thus white acetylated polymer is obtained.

The yield thereof is 95%, $D_{200}^{60NA}$ thereof being 0.6%, while the untreated polymer has $D_{200}^{60NA}$ being 10.8%, and heat-stability is very much enhanced.

As to the degree of polymerization $\eta_{inh}$ of acetylated polymer is 1.31 against 1.35 of the untreated polymer and no remarkable change was observed.

Examples 15-52

3 grams of the polymer obtained by polymerizing trioxane with the catalyst in solid phase such as POM-2 is subjected to reaction at a given temperature for a given period of time against 500% weight of the reagent or its solution of a suitable solvent of a given concentration.

After reaction the treated matter is poured into acetone, and thus obtained polymer is treated by Soxhlet apparatus along with acetone or methanol continuously, and the excessive reagent is removed as much as possible, and then vacuum dried, and the result is shown on Table 3.

The heat-stability thereof is much improved when compared with untreated polymer with $D_{200}^{30}$ being 27.3%, $D_{200}^{60NA}$ being 8.3%.

In regard to the degree of polymerization of thus obtained polymer in this reaction $\eta_{inh}$ being 1.38 is not almost affected, and as a matter of fact, the toughness thereof is the same in forming film by adding A14, nylon thereto.

N-peracylamide employed:

| Example: | N-peracylamide |
|---|---|
| 15 | Diacetamide. |
| 16 | N-methyl-diacetamide. |
| 17 | N-heptadecyl-diacetamide. |
| 18 | N-cyclohexyl-diacetamide. |
| 19 | Diacet-o-toluidide. |
| 20 | Diacet-p-chloroanilide. |
| 21 | Diacet-p-phenetidide. |
| 22 | Diacet-m-nitroanilide. |
| 23 | Dichloroacet-anilide. |
| 24 | Di-$\beta$-ethylthiopropionanilide. |
| 25 | Dibenzanilide. |
| 26 | D-m-chlorobenzanilide. |
| 27 | N-benzyldiacetamide. |
| 28 | N-acetylbenzanilide. |
| 29 | N-furfuryldiacetamide. |
| 30 | N-butyldifuramide. |
| 31 | 4-diacetylamino-3,4-dihydrocumarin. |
| 32 | N-$\beta$-pyridyldiacetamide. |
| 33 | 4-diacetylamino-3,5-diphenyl-1,2,4-triazol. |
| 34 | N-acetylcaprolactam. |
| 35 | N-acetylphthalimidine. |
| 36 | NN'-diacetyl-2,5-diketopiperazine. |
| 37 | N-acetylsuccinimide. |
| 38 | N-acetyl-2,6-diketomorpholine. |
| 39 | N-acetyl-4-phenyl-2,6-diketopiperazine. |
| 40 | N-acetylurethan. |
| 41 | NN'-diacetylhydantoin. |
| 42 | N-tetraacetylacetylenediurein. |
| 43 | N-methyl-N-ethoxyacylacetamide. |
| 44 | Oxalyl-bis-(N-acetanilide). |
| 45 | NN'-diacetyl-2,3-diketopiperazine. |
| 46 | N-acetylisatin. |
| 47 | N-diacetyl-N'-dimethylhydrazine. |
| 48 | Tetraacetylhydrazine. |
| 49 | N-diacetylamino-succinimide. |
| 50 | NN'-diacetylphthalhydrazide. |
| 51 | N-acetyl-thiobenzanilide. |
| 52 | N-acetylthiohydantoin. |

RESULTS

| Exs. No. | Conc. (percent) | Solvent | Temp. (° C.) | Time (hrs) | Yield (percent) | $D_{200}^{30}$ (percent) | $D_{200}^{30NA}$ (percent) | $\eta_{inh}$ |
|---|---|---|---|---|---|---|---|---|
| 15 | 70 | BL | 165 | 1 | 61 | 13.8 | 1.7 | |
| 16 | 70 | BL | 170 | 1 | 65 | 15.2 | 1.9 | |
| 17 | 70 | BL | 165 | 1 | 58 | 16.2 | 2.1 | 1.25 |
| 18 | 70 | AP | 170 | 1 | 54 | 16.7 | 1.1 | |
| 19 | 100 | | 170 | 1.5 | 92 | 10.6 | 0.5 | 1.32 |
| 20 | 100 | | 170 | 1.5 | 94 | 13.9 | 0.4 | 1.36 |
| 21 | 100 | | 170 | 1.5 | 95 | 12.4 | 0.3 | 1.36 |
| 22 | 70 | A | 170 | 1.5 | 87 | 14.3 | 0.5 | 1.37 |
| 23 | 70 | A | 165 | 1.5 | 73 | 15.2 | 0.7 | |
| 24 | 70 | A | 170 | 1.5 | 88 | 9.8 | 0.5 | |
| 25 | 70 | A | 170 | 1.5 | 91 | 11.4 | 0.8 | |
| 26 | 70 | AP | 170 | 1.5 | 87 | 13.1 | 0.9 | |
| 27 | 100 | | 175 | 1 | 86 | 12.7 | 0.4 | |
| 28 | 70 | A | 170 | 1.5 | 89 | 11.8 | 0.4 | 1.28 |
| 29 | 100 | | 165 | 1 | 86 | 10.8 | 0.5 | |
| 30 | 70 | A | 170 | 1.5 | 83 | 13.5 | 0.9 | |
| 31 | 60 | A | 170 | 1.5 | 78 | 10.6 | 0.9 | |
| 32 | 70 | A | 170 | 1 | 74 | 9.1 | 0.6 | 1.33 |
| 33 | 70 | A | 170 | 1 | 68 | 16.2 | 1.1 | |
| 34 | 100 | | 170 | 1 | 73 | 13.1 | 0.8 | |
| 35 | 70 | BL | 170 | 1 | 71 | 14.1 | 0.6 | |
| 36 | 70 | BL | 170 | 1 | 66 | 10.2 | 0.8 | |
| 37 | 80 | A | 170 | 1 | 89 | 10.8 | 0.3 | 1.28 |
| 38 | 80 | A | 170 | 1 | 95 | 12.5 | 0.4 | 1.38 |
| 39 | 70 | A | 165 | 1.5 | 93 | 11.5 | 0.5 | 1.37 |
| 40 | 70 | BL | 170 | 1 | 73 | 12.8 | 1.0 | |
| 41 | 70 | BL | 170 | 1 | 70 | 13.3 | 1.1 | |
| 42 | 70 | BL | 170 | 1 | 72 | 11.7 | 0.9 | 1.27 |
| 43 | 80 | A | 165 | 1 | 74 | 13.7 | 1.3 | |
| 44 | 80 | A | 165 | 1.5 | 72 | 12.7 | 1.0 | |
| 45 | 70 | BL | 165 | 1.5 | 78 | 13.9 | 1.0 | |
| 46 | 70 | A | 170 | 1 | 86 | 11.9 | 0.8 | |
| 47 | 80 | A | 170 | 1.5 | 89 | 10.2 | 0.9 | 1.36 |
| 48 | 80 | BL | 170 | 1 | 92 | 12.8 | 0.6 | |
| 49 | 70 | BL | 170 | 1.5 | 90 | 10.7 | 0.5 | 1.31 |
| 50 | 70 | BL | 165 | 1.5 | 87 | 11.6 | 0.9 | |
| 51 | 80 | A | 170 | 1.5 | 78 | 12.1 | 0.8 | |
| 52 | 80 | A | 170 | 1.5 | 69 | 14.7 | 1.1 | |

Wherein A stands for anisole, BL stands for γ-butyrolactone and AP stands for acetophenone.

What is claimed is:

1. A process for the stabilization of homopolymers of formaldehyde or trioxane and copolymers of trioxane with a copolymerizable monomer selected from styrene, dioxolane and dioxepane comprising the steps of reacting the hydroxyl terminal groups of said compounds with acylating agents at temperatures ranging from room temperature to 250° C., said acylating agent compounds having the general formula

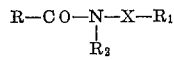

wherein X represents carbonyl or thiocarbonyl, R represents an alkyl having 1 to 20 carbon atoms, a cycloalkyl, an alkenyl of 1 to 20 carbon atoms, an aryl compound selected from phenyl, naphthyl, an oxygen or nitrogen containing heterocyclic group; $R_1$ represents an alkyl having 1 to 20 carbon atoms, a cycloalkyl, an alkenyl having 1 to 20 carbon atoms, an aryl compound selected from phenyl, naphthyl an anthryl, a lower alkoxy, a lower alkoxy carbonyl, a substituted carbamoyl, a substituted amino or an oxygen or nitrogen containing heterocyclic group; $R_2$ represents a hydrogen atom, an alkyl having 1 to 20 atoms, a cycloalkyl, an aryl compound selected from phenyl, naphthyl, or anthryl, an alkenyl having 1 to 20 carbon atoms, a substituted amino, or an oxygen or nitrogen containing heterocyclic group, and $R_1$ and $R_2$, when taken together, form a heterocyclic ring with a nitrogen atom and X.

2. A process for the stabilization of homopolymers of formaldehyde or trioxane and copolymers of trioxane with a copolymerizable monomer selected from styrene, dioxolane and dioxepane comprising the steps of reacting the hydroxyl terminal groups of said compounds with N-acetyl phthalimide as an acylating agent at a temperature in the range of from room temperature to 250° C.

3. A process for the stabilization of homopolymers of formaldehyde or trioxane and copolymers of trioxane with a copolymerizable monomer selected from styrene, dioxolane and dioxepane which comprises the steps of reacting the hydroxyl terminal groups of said compounds with diacetanilide as an acylating agent at a temperature in the range of from room temperature to 250° C.

4. A process for the stabilization of homopolymers of formaldehyde or trioxane and copolymers of trioxane with a copolymerizable monomer selected from styrene, dioxolane and dioxepane which comprises the steps of reacting the hydroxyl terminal groups of said compounds with N-methyl-diacetamide as an acylating agent at a temperature in the range of from room temperature to 250° C.

5. A process for the stabilization of homopolymers of formaldehyde or trioxane and copolymers of trioxane with a copolymerizable monomer selected from styrene, dioxolane and dioxepane which comprises the steps of reacting the hydroxyl terminal groups of said compounds with N-ethyl-diacetamide as an acylating agent at a temperature in the range of from room temperature to 250° C.

6. A process for the stabilization of homopolymers of formaldehyde or trioxane and copolymers of trioxane with a copolymerizable monomer selected from styrene, dioxolane and dioxepane which comprises the steps of reacting the hydroxyl terminal groups of said compounds with N-acetoxy-ethyl-diacetamide as an acylating agent at a temperature in the range of from room temperature to 250° C.

7. A process for the stabilization of homopolymers of formaldehyde or trioxane and copolymers of trioxane with a copolymerizable monomer selected from styrene, dioxolane and dioxepane which comprises the steps of reacting the hydroxyl terminal groups of said compounds with N-allyl-diacetamide as an acylating agent at a temperature in the range of from room temperature to 250° C.

8. A process for the stabilization of homopolymers of formaldehyde or trioxane and copolymers of trioxane with a copolymerizable monomer selected from styrene, dioxolane and dioxepane which comprises the steps of reacting the hydroxyl terminal groups of said compounds with diacetotoluidide as an acylating agent at a temperature in the range of from room temperature to 250° C.

9. A process for the stabilization of homopolymers of formaldehyde or trioxane and copolymers of trioxane with a copolymerizable monomer selected from styrene, dioxolane and dioxepane which comprises the steps of reacting the hydroxyl terminal groups of said compounds with diacetanisidide as an acylating agent at a temperature in the range of from room temperature to 250° C.

10. A process for the stabilization of homopolymers of formaldehyde or trioxane and copolymers of trioxane with a copolymerizable monomer selected from styrene, dioxolane and dioxepane which comprises the steps of reacting the hydroxyl terminal groups of said compounds with diacetophenetidide as an acylating agent at a temperature in the range of from room temperature to 250° C.

11. A process for the stabilization of homopolymers of formaldehyde or trioxane and copolymers of trioxane with a copolymerizable monomer selected from styrene, dioxolane and dioxepane which comprises the steps of reacting the hydroxyl terminal groups of said compounds with N-acetyl-succinimide as an acylating agent at a temperature in the range of from room temperature to 250° C.

References Cited

UNITED STATES PATENTS

| | | | |
|---|---|---|---|
| 2,844,561 | 7/1958 | Bechtold et al. | 260—67 |
| 2,964,500 | 12/1960 | Jenkins et al. | 260—67 |
| 3,017,389 | 1/1962 | Langsdorf et al. | 260—67 |
| 3,046,251 | 7/1962 | Wagner | 260—67 |
| 3,116,267 | 12/1963 | Dolce | 260—45.9 |
| 3,131,165 | 4/1964 | Hermann et al. | 260—45.9 |
| 3,155,636 | 11/1964 | Kritzler et al. | 260—67 |
| 3,274,149 | 9/1966 | Berardinelli | 260—45.8 |

WILLIAM H. SHORT, *Primary Examiner.*

L. M. PHYNES, *Assistant Examiner.*